(12) United States Patent
Karatay et al.

(10) Patent No.: US 12,734,469 B2
(45) Date of Patent: Sep. 15, 2026

(54) COMBINED MANIFOLDING AND GAS-LIQUID SEPARATION

(71) Applicant: ELECTRIC HYDROGEN CO., Natick, MA (US)

(72) Inventors: Elif Karatay, Mountain View, CA (US); Jeffrey Dean Glandt, Vancouver (CA); Alex Panchula, Hillsborough, CA (US); Jigish Trivedi, Pleasanton, CA (US)

(73) Assignee: ELECTRIC HYDROGEN CO., Devens, MA (US)

( * ) Notice: Subject to any disclaimer, the term of this patent is extended or adjusted under 35 U.S.C. 154(b) by 312 days.

(21) Appl. No.: 18/684,963

(22) PCT Filed: Dec. 21, 2022

(86) PCT No.: PCT/US2022/053694
§ 371 (c)(1),
(2) Date: Feb. 20, 2024

(87) PCT Pub. No.: WO2023/129452
PCT Pub. Date: Jul. 6, 2023

(65) Prior Publication Data

US 2024/0350953 A1 Oct. 24, 2024

Related U.S. Application Data

(60) Provisional application No. 63/294,632, filed on Dec. 29, 2021.

(51) Int. Cl.
*B01D 53/02* (2006.01)
*B01D 45/04* (2006.01)
(Continued)

(52) U.S. Cl.
CPC ............ *B01D 45/08* (2013.01); *B01D 45/04* (2013.01); *B01D 46/003* (2013.01); *B01D 50/20* (2022.01); *C25B 15/08* (2013.01)

(58) Field of Classification Search
CPC ............................ B01D 17/045; B01D 17/12; B01D 2313/105; B01D 45/04; B01D 45/08;
(Continued)

(56) References Cited

U.S. PATENT DOCUMENTS 4,316,728 A * 2/1982 Caesar .................. B01D 45/08
96/228
4,385,912 A * 5/1983 Parrick ................. B01D 45/16
4/209 R
(Continued)

OTHER PUBLICATIONS

International Search Report and Written Opinion for PCT/US2022/053694, dated Jul. 3, 2023, pp. 1-9.

*Primary Examiner* — Christopher P Jones
(74) *Attorney, Agent, or Firm* — Lempia Summerfield Katz LLC

(57) ABSTRACT

The following disclosure related to gas-liquid separation in a two-phase flow. More specifically, the following disclosure relates to passive gas-liquid separation of a two-phase flow in an outlet manifold that combines an outlet flow from a plurality of electrolytic cells or an electrolytic cell stack where performance may be dependent on shape of a conduit conveying the two-phase flow.

7 Claims, 7 Drawing Sheets

(51) Int. Cl.

| | |
|---|---|
| ***B01D 45/08*** | (2006.01) |
| ***B01D 46/00*** | (2022.01) |
| ***B01D 50/20*** | (2022.01) |
| ***C25B 15/08*** | (2006.01) |

(58) Field of Classification Search
CPC ...... B01D 46/003; B01D 50/20; B01D 61/52; C25B 1/04; C25B 15/08
See application file for complete search history.

(56) References Cited

U.S. PATENT DOCUMENTS 7,390,341 B2 * 6/2008 Jeuch .................... B01D 45/06 55/423
8,657,897 B2 * 2/2014 Kayat .................... B01D 53/24 55/443
9,056,319 B2 * 6/2015 Eliasson ................ B04B 5/005
2006/0086074 A1 4/2006 Kasuya et al.
2010/0021778 A1 1/2010 Steinshnider et al.
2013/0189592 A1 7/2013 Roumi et al.
2022/0064808 A1 * 3/2022 Ono ...................... C25B 11/031
2022/0380916 A1 * 12/2022 Kitagawa .................. C25B 9/19
2023/0211266 A1 * 7/2023 Koechel ............. B01D 46/0005 95/268

* cited by examiner

COMBINED MANIFOLDING AND GAS-LIQUID SEPARATION

The present patent document is a § 371 nationalization of PCT Application Serial No. PCT/US2022/053694, filed Dec. 21, 2022, designating the United States, which claims the benefit of U.S. Provisional Patent Application No. 63/294,632, filed Dec. 29, 2021, which are hereby incorporated by reference in their entireties.

FIELD

The following disclosure relates to gas-liquid separation in an outlet manifold, particularly for electrochemical or electrolytic cells or an electrolytic cell stack but is not limited thereto.

BACKGROUND

Generally, a flow of single-phase water is input into an electrolytic cell through an input manifold. The input manifold may supply single phase water to a plurality of cells or a cell stack. The electrolytic cells produce oxygen at an anode and hydrogen at a cathode, during water electrolysis. During water electrolysis, some of the water input into the cell may not be converted into oxygen or hydrogen, respectively. Accordingly, a two-phase flow including generated gas (e.g., oxygen, hydrogen) and unreacted water are transferred out from the cell. An outlet manifold may receive the outlet flow of generated gas and unreacted water from a plurality of cells or a cell stack to separate the generated gas from the unreacted water. There remains a need for an improved separation process of the unreacted water from the gas generated during electrolysis.

SUMMARY

In one embodiment, a gas-liquid separator includes an inlet configured to receive a first portion a two-phase flow, the first portion of the two-phase flow flowing through the center of a conduit, a converging channel fluidly coupled to the inlet and configured to receive the first portion of the flow, a first outlet fluidly coupled to the inlet and the converging channel and configured to receive the first portion of the flow, a collector plate configured to receive a second portion of the two-phase flow, the second portion flowing at the outside of the conduit and not flowing through the inlet, and a second outlet fluidly coupled to the collector plate and configured to receive the second portion of the flow.

In one embodiment, a gas-liquid separator includes an inlet arm configured to receive a first flow, wherein the first flow is a two-phase flow comprising a gas and a liquid, a run arm receiving a second flow, a side arm receiving a third flow, and a junction connecting the inlet arm, the run arm, and the side arm, wherein the apparatus is configured to separate the gas and the liquid at or near the junction such that the second flow comprises a higher percentage of liquid than the first flow, and the third flow comprises a higher percentage of the gas than the first flow.

In one embodiment, a gas-liquid separator includes an inlet arm configured to receive a first flow consisting of gas and liquid, a downward arm receiving a second flow, an upward arm receiving a third flow, and a junction connecting the inlet arm, the downward arm, and the upward arm, wherein the apparatus is configured to separate the liquid and the gas at or near the junction such that the second flow comprises a higher percentage of the liquid than the first flow, and the third flow comprises a higher percentage of the gas than the first flow.

In one embodiment, a method of separating a two-phase gas-liquid flow includes creating a maldistribution of liquid matter and gaseous matter in the two-phase flow such that a first portion of the two-phase flow having a higher percentage of liquid than the entire two-phase flow and a second portion of the two-phase flow having a higher percentage of gas than the entire two-phase flow are created, directing the first portion of the two-phase flow to a first pathway, and directing the second portion of the two-phase flow to a second pathway.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

DETAILED DESCRIPTION

Disclosed herein are apparatuses and systems for gas-liquid separation in a two-phase flow. The performance (e.g., attainable degree of separation) of some of the apparatuses disclosed herein may be, in part, dependent on the shape of the conduit conveying the two-phase flow. For example, in some embodiments a higher degree of separation may be obtained while using a conduit having a circular cross section due a circular conduits tendency to create and/or perpetuate a spiral flow through the conduit. Similarly, the performance of some of the apparatuses disclosed herein may be, in part, dependent on the apparatuses location in a system or series of conduits and the flow properties resulting from some system of or series of conduits. For example, in some embodiments, a higher degree of separation may be obtained when one of the apparatuses disclosed herein is located in a manifold downstream of a location where the plurality of high velocity jets enter the manifold. The plurality of jets may impinge on the wall of the manifold, creating a spiral flow through the manifold.

Each of the apparatuses or systems for gas-liquid separation disclosed herein may be used independently or with another apparatus or system for gas-liquid separation to achieve a desired degree of separation. For example, one or more of the apparatuses or systems disclosed herein may be used to achieve a desired degree of separation or one or more of the apparatuses or systems disclosed herein may be used in combination with an already known means of gas liquid separation.

In certain examples, the gas-liquid separation apparatus or system disclosed herein may be used within a water electrolysis system. Nonetheless, the gas-liquid separation apparatus or system is not limited to such a water electrolysis system but may be applicable to other systems having a two-phase flow requiring the separation of liquid and gas phases.

Figure 1:
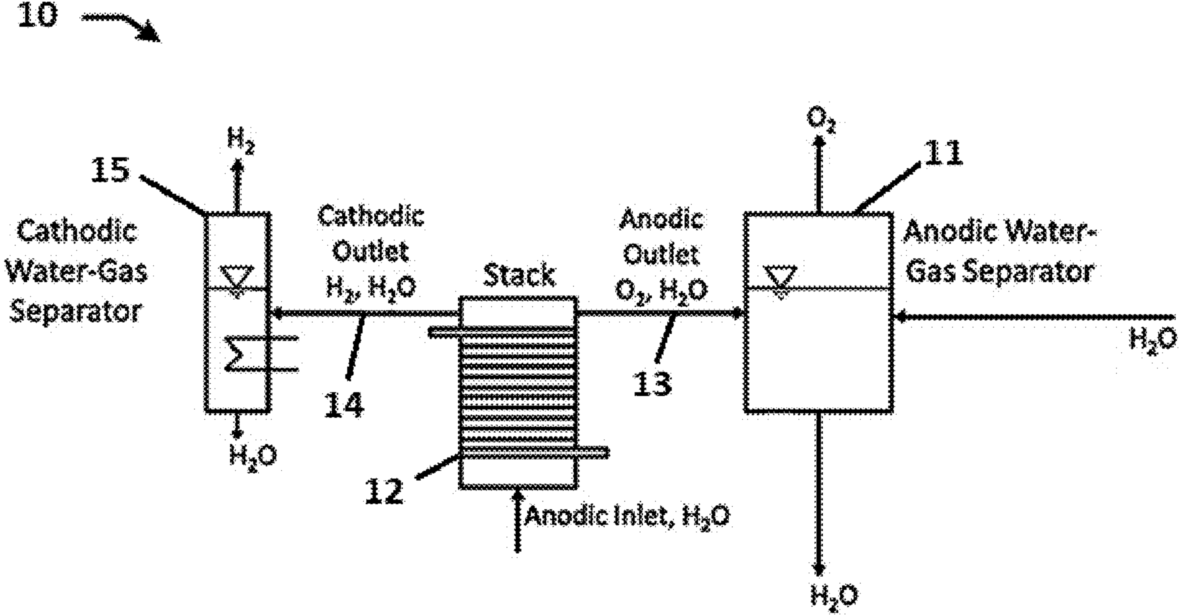
FIG. 1 depicts a section of an example water electrolysis system that may include one or more of the gas-liquid separators disclosed herein.

FIG. 1 depicts an example of a section of a water electrolysis system 10 that may include one or more of the gas-liquid separators as disclosed herein. The system 10 as illustrated in FIG. 1 includes an anodic gas-liquid separator 11, an electrolytic cell stack 12 having a plurality of electrolytic cells, an anodic outlet manifold 13, a cathodic outlet manifold 14, and a cathodic gas-liquid separator 15. Additional downstream components of the system 10 following the cathodic gas-liquid separator 15 have not been depicted in FIG. 1 to provide a simplified excerpt of a system, but may include additional water-gas separators, purifiers, heat exchangers, circulation pumps, pressure regulators, etc. Further, additional downstream components of the system 10 following the anodic gas-liquid separator 11 have not been depicted in FIG. 1 to provide a simplified excerpt of a system, but may include additional gas-liquid separators, purifiers, heat exchangers, circulation pumps, pressure regulators, etc.

As illustrated in the system 10 of FIG. 1, water ($H_2O$) may flow from an external source to the anodic gas liquid separator 11. The anodic gas-liquid separator 11 may remove any gaseous oxygen entrained the flow of water entering the anodic gas-liquid separator. The water is then outlet from the gas liquid separator 11. The water outlet from the anodic gas-liquid separator 11 may be supplied to the anodic inlet of an electrolytic cell stack 12. In some embodiments, the water outlet from the anodic gas-liquid separator may further go through de-ionization and/or a heat exchanging process before being inlet to the electrolytic cell stack 12. In some embodiments, the anodic inlet of the cell stack 12 may receive water from a source other than the anodic gas-liquid separator 11.

In some embodiments, only the anodic inlet of the cell stack 12 may receive water. In these embodiments, the cathode side of the cell stack 12 may not receive water (e.g., a dry cathode side may be used). In another embodiment, a cathode inlet may also receive water from the anodic gas-liquid separator 11 or another source. In these embodiments, the water may be supplied to the cathode inlet to cool the cell stack 12 during electrolysis.

The water supplied to the anodic inlet flows to an anodic inlet manifold that distributes the water to the anode side of the plurality of cells contained with the cell stack 12. In embodiments where water is supplied to the cathode inlet, water supplied to the cathode inlet flows to a cathodic inlet manifold that distributes the water to the cathode side of the plurality of cells in the cell stack 12.

During electrolysis, oxygen ($O_2$) is produced at the anode side of the electrolytic cells and hydrogen ($H_2$) is produced at the cathode side of the electrolytic cells. Specifically, a water splitting electrolysis reaction is configured to take place within each individual cell in the cell stack 12. Each cell includes one interface (the anode side of the cell) configured to run an oxygen evolution reaction (OER) and another interface (the cathode side of the cell) configured to run a hydrogen evolution reaction (HER). For example, the anode reaction is $H_2O \rightarrow 2H^+ + \frac{1}{2}O_2 + 2e$ and the cathode reaction is $2H^+ + 2e \rightarrow H_2$.

During electrolysis, some of the water supplied to the anode side of an electrolytic cell may not be converted into oxygen. Accordingly, a two-phase flow of oxygen and unreacted water is outlet from each of the anode sides of the cells into an anodic outlet manifold 13. The two-phase flow of oxygen and unreacted water flows from the cell stack 12 to the anodic gas-liquid separator 11 through the anodic outlet manifold 13. The anodic gas liquid separator 12 may be configured to separate the unreacted water from the gaseous oxygen.

Additionally, in some embodiments, water may be supplied to the cathode side of the cell stack as a coolant. Accordingly, a two-phase flow of hydrogen and water is outlet from each of the cathode sides of the cells to a cathodic outlet manifold 14. The two-phase flow of hydrogen and water flows from the cell stack 12 to the cathodic gas-liquid separator 15 through the cathodic outlet manifold 14. The cathodic gas-liquid separator 15 may be configured to separate the water from the gaseous hydrogen.

In some embodiments, the anodic outlet manifold 13 and cathodic outlet manifold outlet 14 may receive anodic side outlet flow and cathodic side outlet flow respectively from a plurality of cells in the cell stack 12. In some instances, particularly when the system 10 is used in a factory or plant setting, the anodic outlet manifold 13 and cathodic outlet manifold 14 may have to travel a significant length to reach an anodic gas-liquid separator 11 or a cathodic gas-liquid separator 15 respectively. For example, an anodic or cathodic outlet manifold having a length of 50-60 feet may not be uncommon.

Figure 2:
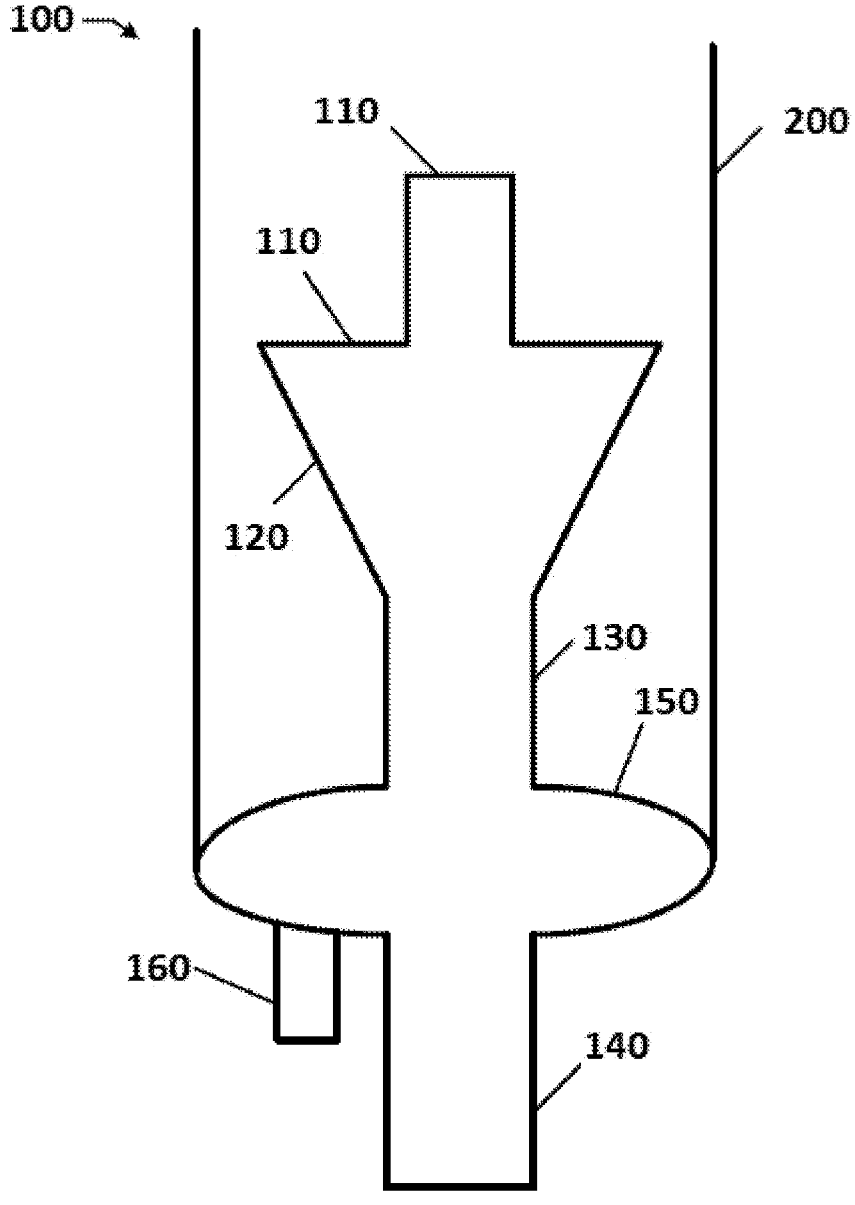
FIG. 2 depicts a centrifugal gas-liquid separator according to an exemplary embodiment of the present disclosure.

FIG. 2 depicts a centrifugal gas-liquid separator 100 according to an exemplary embodiment of the present disclosure. The centrifugal gas-liquid separator 100 as illustrated in FIG. 1 may be inserted into a manifold 200 and includes inlets 110, a converging channel 120, a center channel 130, a first outlet 140, a catch plate 150, and a second outlet 160.

The centrifugal gas-liquid separator 100 as illustrated in FIG. 1 may be configured to take advantage of a two-phase (e.g., liquid and gaseous) flow through a conduit. The separator 100 may be configured to take advantage of a spiral or rotating flow through a conduit. In some instances, a spiral flow may naturally occur or be maintained by conduits having a circular shape. In other embodiments, a circular flow may be generated by impingement of a high velocity flow on the walls of a conduit having a circular shape. In some embodiments, the separator 100 may take advantage of an inherent spiral flow created by the high velocity jets in the recombined fluid at electrolyzer (e.g., electrolytic cell or stack) outlets (either anodic or cathodic side outlets). In some embodiments, one or more inlets providing a two-phase flow to the conduit may be positioned such that a spiral flow is created in the conduit.

The separator 100 may advantageously use the spiral nature of the two-phase flow to separate the gas and liquid flowing through a conduit. The spiral nature of the two-phase flow causes an outward radial velocity to be applied to both the liquid and the gas flowing through the conduit.

The liquid phase matter (e.g., water) flowing through the conduit have more inertia than the gas phase matter (e.g., oxygen or hydrogen) flowing through the conduit causing the liquid matter to impinge on the side of the conduit and for a higher percentage liquid phase matter to be located radially outward (closer to the wall of the conduit) from the center of the conduit. Accordingly, a flow maldistribution may occur such that a higher percentage of gaseous phase matter flows through the center of the conduit and a higher percentage of liquid phase matter flows through an outside portion of the conduit (e.g., closer to the walls of the conduit).

The conduit 200 is a conduit through which a two-phase flow of liquid and gas flows. The conduit 200 may be an outlet manifold for an electrolytic cell or an electrolytic cell stack. In some embodiments, the conduit 200 may be an anodic (i.e., anode side) outlet manifold. In other embodiments, the conduit 200 may be a cathodic (i.e., cathode side) outlet manifold. In some embodiment, the conduit 200 may be made of metal. In some embodiments, the conduit may include a corrosion resistant metal such as stainless steel. In other embodiments, the conduit may include platinum or gold. In some embodiments, the conduit may include a base composition (e.g., a first metal) covered by a coating composition (e.g., second metal), wherein the coating composition is configured to prevent leaching of ions from the base composition. For example, a second metal coating may prevent iron contamination of high purity electrolysis water flowing through the conduit. The second metal may be, for example, a platinum coating, a gold coating, or the like.

The inlets 110 allow a portion of the two-phase flow including gaseous matter to enter converging channel 120. As discussed above, the spiral or rotating nature of the two-phase flow causes the liquid (e.g., water) in the two-phase flow to impinge on the walls of the conduit and/or accumulate in an outer region of the conduit 200 (e.g., near the wall of the conduit). Accordingly, the portion of the two-phase flow received through inlets 110 may predominantly include gaseous matter.

The portion of the flow received by inlets 110 flows through inlets 110 into converging channel 120. In some embodiments, an area (e.g., circular cross-sectional area) of the upstream end of the converging channel 120 and thus the area of inlets 110 may be modified such that a desired portion of flow is received by inlets 110. In some embodiments, the area of the inlets may be designed in consideration of a tolerable quantity, or an allowable quantity of liquid matter received by the inlets 110. For example, a smaller area of the inlets 110 disposed in the center of the conduit may provide a smaller quantity of liquid matter than an inlet having a larger area in the same conduit. The conical shape of converging channel 120 may help to prevent water film collected downstream of inlets 110 from entering converging channel 120. Further, the conical shape of converging channel 120 may help to prevent entrainment of droplets in the flow. The portion of flow received by inlets 110 flows through the converging channel 120 into center channel 130 and through center channel 130 to first outlet 140. Accordingly, the first outlet 140 may provide a flow including gaseous matter.

The portion of the flow that does not enter inlets 110 may include a higher percentage of liquid phase matter compared to the portion of the flow entering inlets 110. The portion of the flow that does not enter inlets 110 includes liquid matter that has impinged on the walls of conduit 200. In some embodiments, separator 100 may position vertically such that gravity further assists liquid matter that impinges on the conduit 200 wall to flow downward to collector plate 150.

Collector plate 150 receives the portion of the flow that is not received by inlets 110. This portion of the flow may include a higher percentage of liquid phase matter compared to the portion of the flow entering inlets 110. As this portion of the flow impinges on the walls of the conduit 200 and/or collector plate 150, liquid may collect on the walls of the conduit and/or collector plate, respectively. The liquid collected on the collector plate 150 flows to the second outlet 160. In some embodiments, collector plate 150 and second outlet 160 may be designed such that gravity assists in the flow of matter through second outlet 160. Accordingly, the flow from the second outlet 160 may predominantly include liquid phase matter.

In some embodiments, the separator 100 may be made of the same material as conduit 200. For example, both separator 100 and conduit 200 may be made of a corrosive resistive metal. In some embodiments, the separator 100 may be configured such that it may be inserted into the end of an already existing conduit to provide gas-liquid separation. The separator 100 may not include any moving parts and may passively separate liquids and gases flowing therethrough. The separator 100 may advantageously separate liquids and gases flowing through the conduit using only the flow of fluid through the conduit 200 and without requiring additional equipment or energy consumption. Accordingly, the separator 100 may advantageously reduce the amount space required and the energy consumption in a water electrolysis factory or plant.

Figure 3:
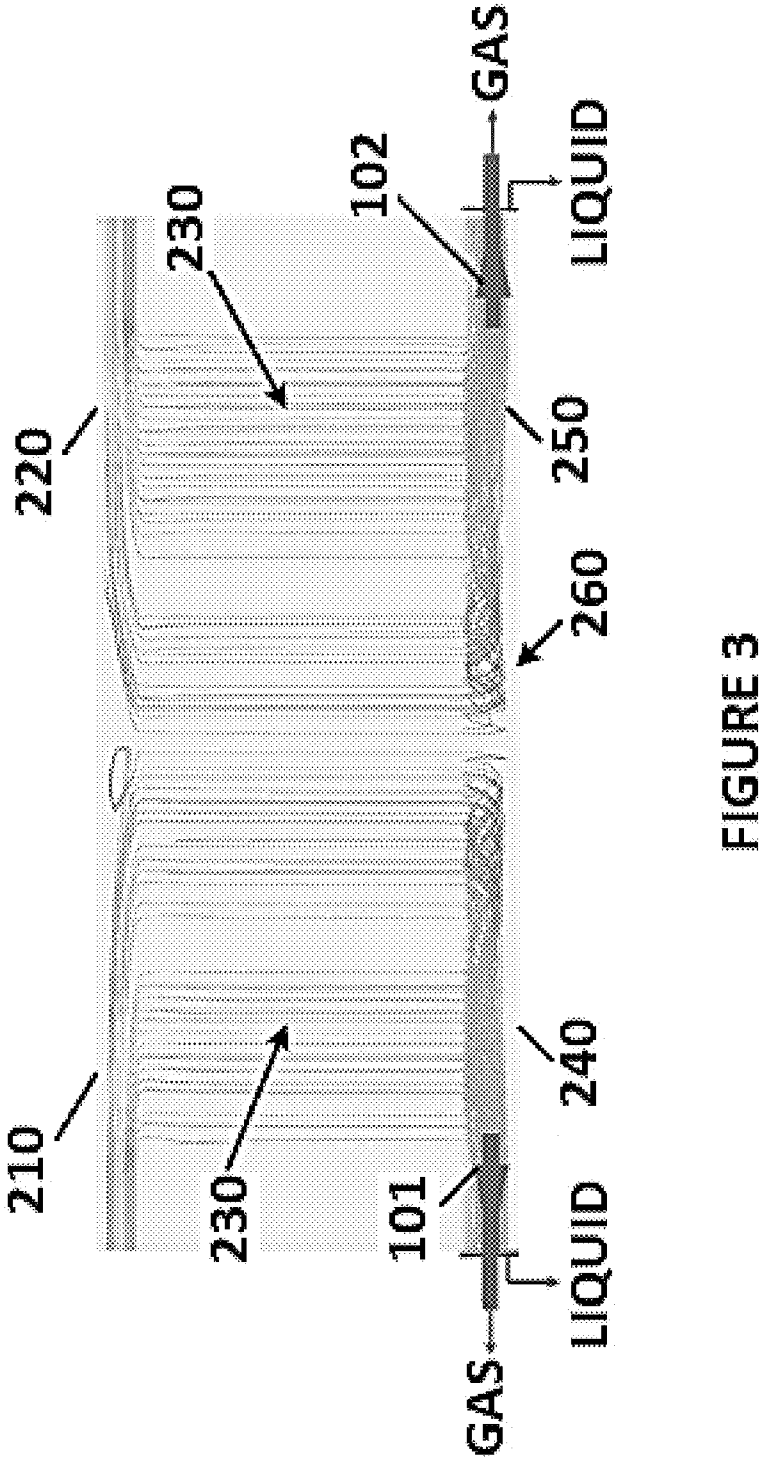
FIG. 3 depicts a system for gas-liquid separation according to an exemplary embodiment of the present disclosure.

FIG. 3 depicts a system for gas-liquid separation 300 according to an exemplary embodiment of the present disclosure. The system 300 as illustrated in FIG. 3 includes a first gas-liquid separator 101 and a second gas-liquid separator 102. Each of the gas-liquid separators 101, 102 may be a gas-liquid separator as described above with respect to FIG. 2. Accordingly, a detailed description of the gas-liquid separators 101, 102 within FIG. 3 is omitted. FIG. 3 further includes a first inlet conduit 210, a second inlet conduit 220, a first outlet conduit 240, a second outlet conduit 250, and spiral flow 260. FIG. 3 further illustrates an example of spiral flow 260 in the second outlet conduit 250.

In certain embodiments, the first inlet conduit 210 and the second inlet conduit 220 may be configured to carry a single-phase flow of liquid water ($H_2O$). The first inlet conduit 210 and the second inlet conduit 220 are connected to the first outlet conduit 240 and the second outlet conduit 250 via connecting channels 230. A two-phase flow may be generated in the connecting channels 230. For example, the connecting channels 230 may be sides of electrolytic cells in which gaseous hydrogen ($H_2$) or oxygen ($O_2$) are produced and become mixed with the liquid water from the first inlet conduit 210 or the second inlet conduit 220. The first outlet conduit 240 and the second outlet conduit may receive a two-phase flow from the connecting channels 230.

As illustrated in FIG. 3, the flow from the first outlet conduit 240 flows into the first separator 101 for gas-liquid separation and the flow from the second outlet conduit 250 flows into the second separator 102 for gas-liquid separation.

In some embodiments, the flows exiting the outlets of the first separator 101 and the second separator 102 may flow through subsequent separators. The first separator 101 and the second separator 102 illustrate a separator 100 in a horizontal orientation. In other embodiments, the separator 100 could be rotated so that gravity may be utilized to aid a flow through the separator.

Figure 4:
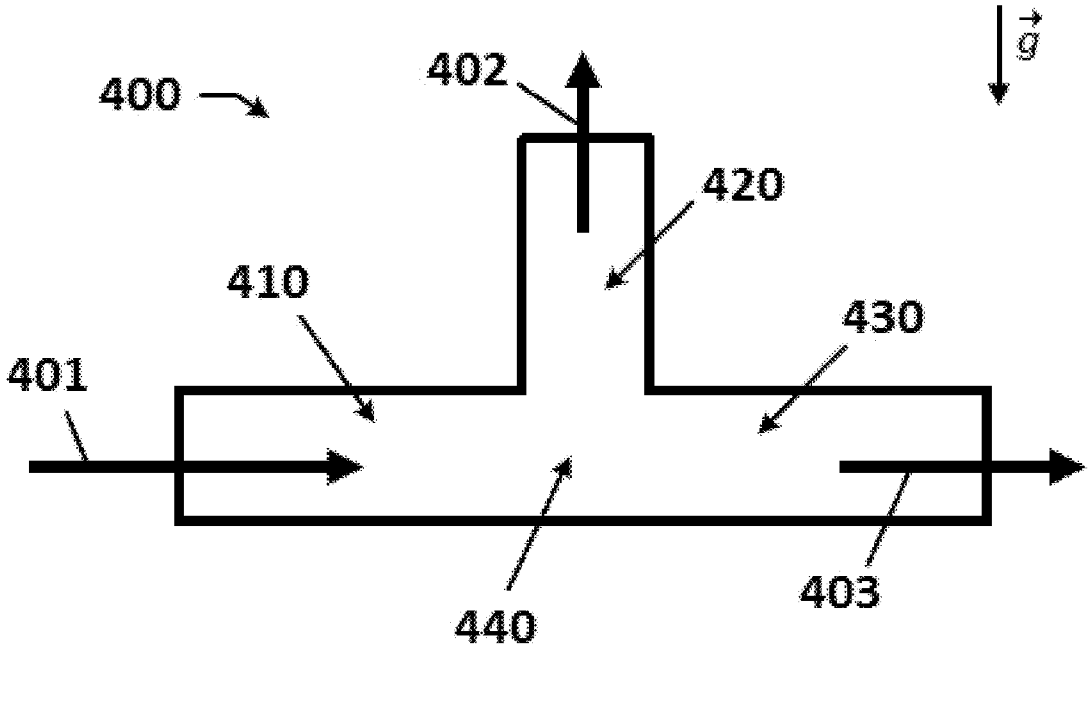
FIG. 4 depicts a run type inertial T-junction separator manifold according to an exemplary embodiment of the present disclosure.

FIG. 4 depicts a run type inertial T-junction separator 400 according to an exemplary embodiment of the present disclosure. The T-junction separators as disclosed herein may utilize a maldistribution of phases that occurs when the two-phase flow enters the T-junction to separate liquid and gas phase matter in the flow. Differences in density between the liquid and gaseous matter affect the buoyant forces acting on the liquid and gaseous matter contributing to maldistribution of liquid and gaseous matter at a T-junction. Further, different inertial forces actioning on the liquid and gaseous matter contribute to the maldistribution of liquid and gaseous matter. For example, due to its higher density, liquid matter may have a higher inertia than the gaseous matter and accordingly may have a tendency to continue traveling in the same direction. Gaseous matter however may have a lower inertia than the liquid matter and may change direction more quickly than the liquid matter.

FIG. 4 depicts a run type inertial T-junction separator 400. The T-junction separator 400 includes an inlet arm 410, a side arm 420, and a run arm 430 all meeting at junction 440. FIG. 4 further includes a first flow 401 being a two-phase liquid and gaseous flow entering inlet 410, a second flow 402 having a higher percentage of gaseous matter compared to the first flow 401, and a third flow 403 having a higher percentage of liquid matter compared to the first flow 401.

As illustrated in FIG. 4, the first flow 401 enters the inlet arm 410 of the run type T-junction separator 400. The first flow 401, comprising the two-phase liquid and gas combination enters junction 440. Upon entering junction 440, a maldistribution of the liquid and gaseous matter in the two-phase flow occurs. As discussed above, the higher density, higher inertia liquid matter in the two-phase flow may continue traveling in the same direction. Further, the higher density liquid matter in the two-phase flow is not likely to travel upwards due to the effects of gravity on the denser liquid matter. Accordingly, the higher density liquid matter in the two-phase flow may continue flowing straight along or into the run arm 430.

The gaseous matter in the two-phase flow has a lower density and lower inertia relative to the liquid matter and accordingly is capable of changing flow direction more quickly than the liquid matter. Accordingly, the gaseous matter in the two-phase flow is more likely to travel upward into the side arm 420 of the run type T-junction separator 400.

Accordingly, the run type T-junction separator 400 may separate the two-phase first flow 401 at or near the junction 440 such that the second flow 402 comprises a higher percentage of gas than the first flow 401, and the third flow 403 comprises a higher percentage of liquid than the first flow 401. The T-junction separator 400 may advantageously separate liquids and gases flowing through the T-junction 440 without requiring additional equipment or power consumption required by alternative means of gas liquid separation. Accordingly, the T-junction separator may advantageously reduce the space required for and power consumption of a water electrolysis factory or plant.

Figure 5A:
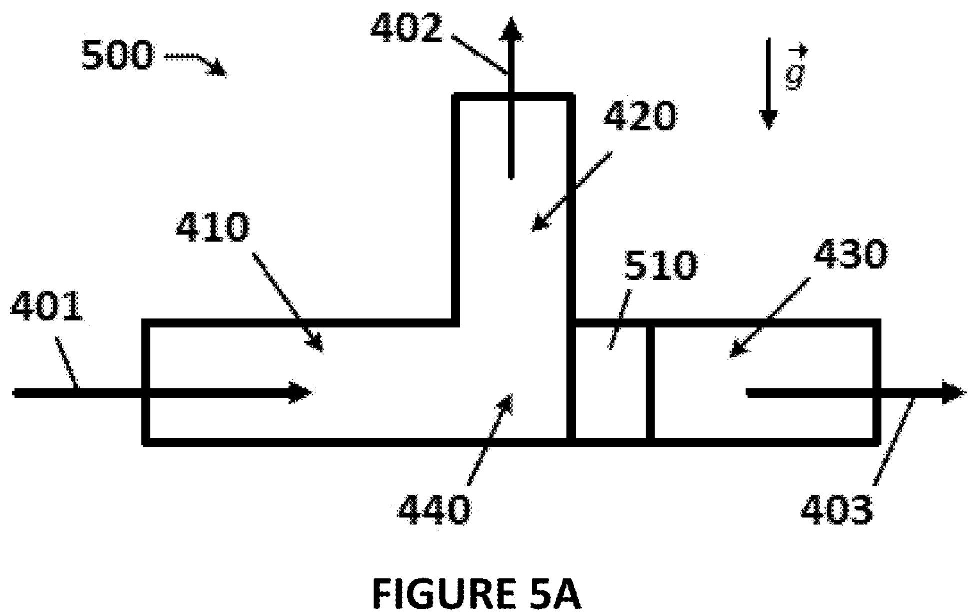
FIG. 5A depicts a run type inertial T-junction separator manifold including a hydrophilic porous media according to an exemplary embodiment of the present disclosure.

FIG. 5A illustrates a run type inertial T-junction separator 500 according to an exemplary embodiment of the present disclosure. FIG. 5A includes a first flow 401, a second flow 402, and a third flow 403. The first flow 401, second flow 402, and third flow 403 may be the same as those described above with respect to FIG. 4, accordingly a detailed description thereof is omitted. The run type inertial separator 500 includes inlet arm 410, side arm 420, and run arm 430 all meeting at junction 440. The inlet arm 410, side arm 420, run arm 430, and junction 440 may all be the same as those discussed above with respect to FIG. 4, accordingly a detailed description thereof is omitted.

The run type inertial T-junction separator 500 as illustrated in FIG. 5A may function similarly to the separator 400 illustrated in FIG. 4. However, separator 500 further includes a porous hydrophilic media 510 located in the run arm 430 of the separator 500. The porous hydrophilic media 510 may be configured to allow passage of liquid therethrough. The pore size of the hydrophilic media may be varied according to the pressure of the two-phase flow entering the separator 400. The hydrophilic media 510 may be, for example, metal mesh, a metal screen, felt, and the like. Further, in some embodiments, a charge may be applied to the hydrophilic media to prevent gas from flowing therethrough while still allowing the liquid to flow through. The run type inertial T-junction separator 500 may advantageously improve gas-liquid separation without requiring additional space or energy consumption.

Figure 5B:
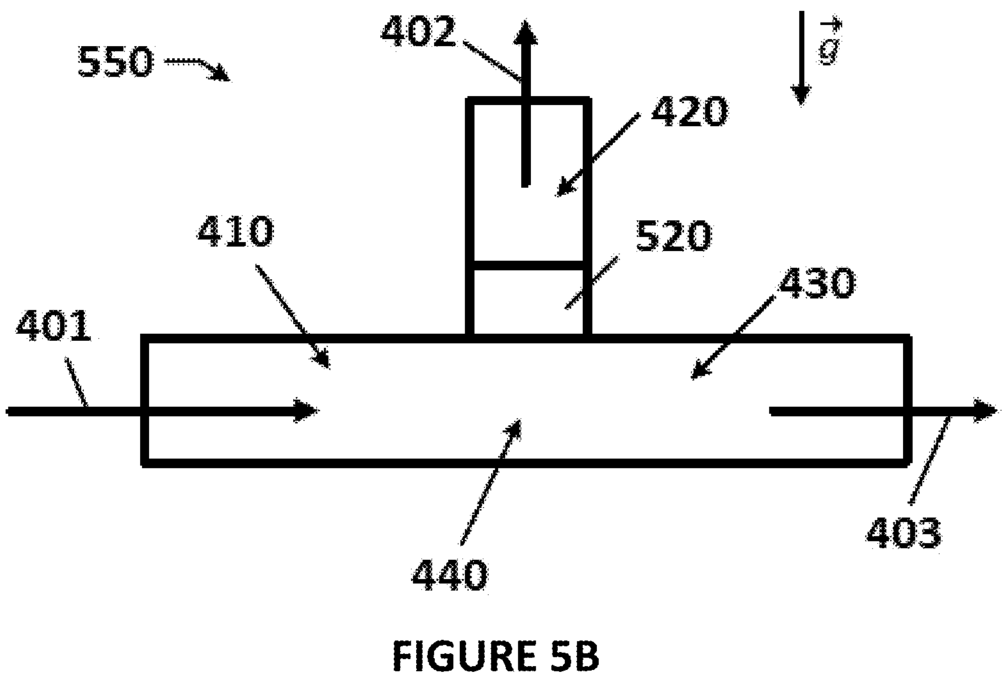
FIG. 5B depicts a run type inertial T-junction separator manifold including a hydrophobic porous media according to an exemplary embodiment of the present disclosure.

FIG. 5B illustrates a run type inertial T-junction separator 550 according to an exemplary embodiment of the present disclosure. FIG. 5B includes a first flow 401, a second flow 402, and a third flow 403. The first flow 401, second flow 402, and third flow 403 may be the same as those described above with respect to FIG. 4, accordingly a detailed description thereof is omitted. The run type inertial separator 550 includes inlet arm 410, side arm 420, and run arm 430 all meeting at junction 440. The inlet arm 410, side arm 420, run arm 430, and junction 440 may all be the same as those discussed above with respect to FIG. 4, accordingly a detailed description thereof is omitted.

The run type inertial T-junction separator 550 as illustrated in FIG. 5B may function similarly to the separator 400 illustrated in FIG. 4. However, separator 550 further includes a porous hydrophobic media 520 located in the side arm 420 of the separator 500. The porous hydrophobic media 520 may be configured to allow passage of gas therethrough, while preventing liquid from passing therethrough. The pore size of the hydrophobic media 520 may be varied according to the pressure of fluid flowing through separator 550. The pore size of the hydrophobic media may be selected so that the capillary pressure in the wick is greater than the water pressure in the junction 440 of the separator 550. The hydrophobic media 520 may be for example a woven or non-woven hydrophobic polymer. Further, in some embodiments, a charge may be applied to the hydrophobic media 520 to prevent water from flowing therethrough while still allowing the gas to flow through. The run type inertial T-junction separator 550 may advantageously improve gas-liquid separation without requiring additional space or energy consumption.

Figure 6:
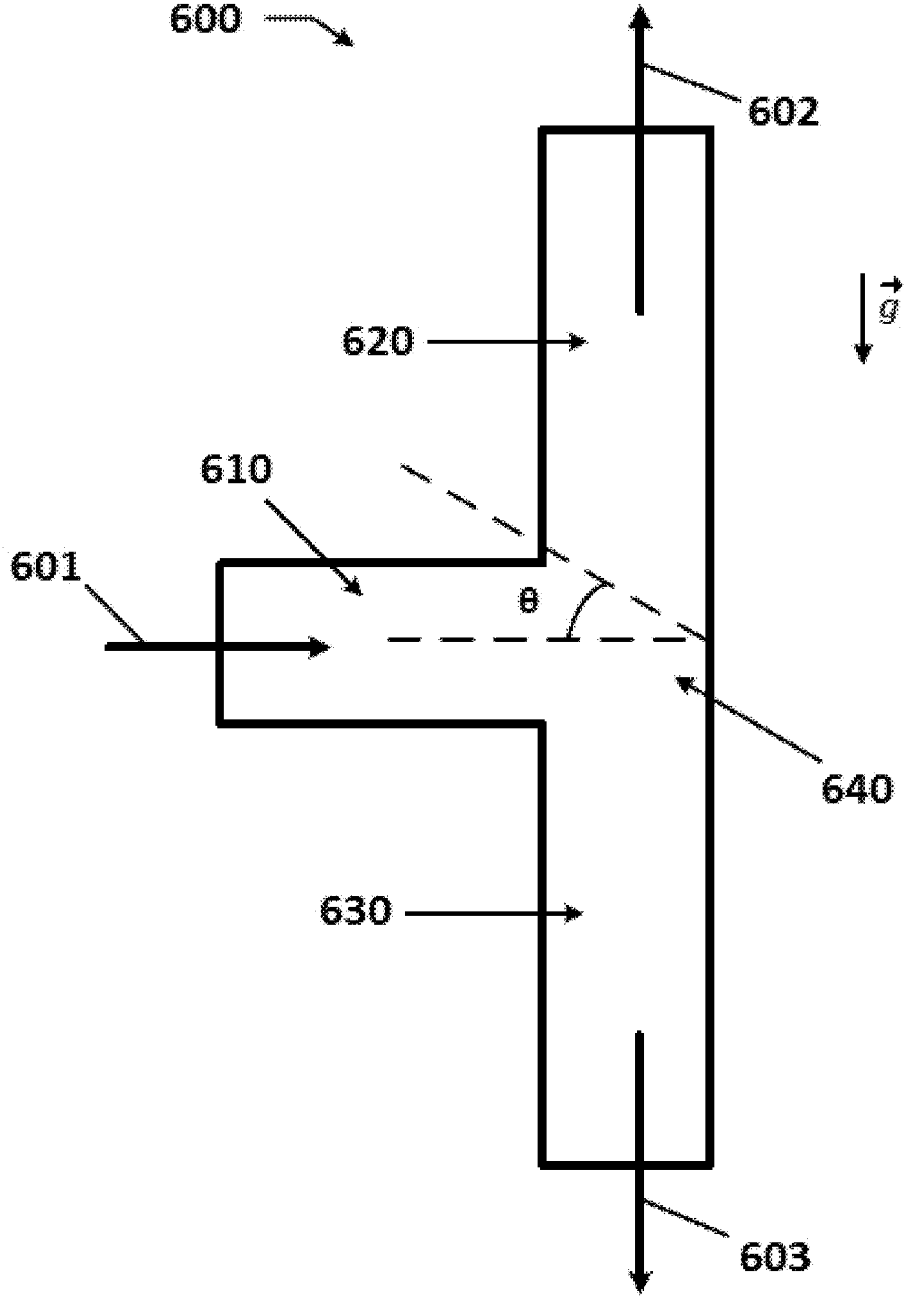
FIG. 6 depicts an impacting type inertial T-junction separator manifold according to an exemplary embodiment of the present disclosure.

FIG. 6 illustrates an impacting type inertial T-junction separator 600 according to an exemplary embodiment of the present disclosure. FIG. 6 illustrates a first flow 601, a second flow 602, and a third flow 603. The first flow 601 may be a two-phase liquid and gas flow. The second flow 602 may be a flow having a higher percentage of gaseous matter compared to the first flow. The third flow 603 may be a flow having a higher percentage of liquid matter compared to the first flow. The separator 600 includes inlet arm 610, upward arm 620, and downward arm 630 all meeting at junction 640.

The impacting type inertial T-junction separator 600, similarly to separator 400 uses a maldistribution of liquid matter and gaseous matter at the junction 640 to separate the liquid and gaseous components of the first flow. The separator 600, similar to the separator 400, utilizes difference in densities of the gaseous matter and the liquid matter to separate the gaseous and liquid matter. In the separator 600, the first flow 601 impacts a wall of the separator 600. After impacting wall of the separator, gravity is utilized to separate the liquid and gaseous matter in the flow. Accordingly, due to the effects of gravity the liquid matter tends to flow downward into the downward arm 630. Conversely, the gaseous matter tends to flow upward into the upward arm 620 due to the lower density of the gaseous matter and the pressure of the flow into the inlet arm 610. Accordingly, the impacting type T-junction separator 600 may separate the two-phase flow at or near the junction such that the second flow 602 comprises a higher percentage of gaseous matter than the first flow 601, and the third flow 603 comprises a higher percentage of liquid than the first flow 601.

In some embodiments, the impacting type separator 600 may include hydrophobic and/or hydrophilic media as described with respect to the embodiments of FIGS. 5A and 5B. Further, in some embodiments, the inlet arm 610 of the separator 600 may be rotated. For example, the inlet arm 610 may be rotated such that a centerline of the inlet arm 610 is oriented at an angle θ as shown in FIG. 6. In some embodiments, the separator may be rotated such that an angle θ corresponding to a centerline of the inlet arm is between or in a range of 0° and 30°, 0° and 45°, 0° and 60°, 15° and 30°, 15° and 45°, 15° and 60°, 30° and 45°, or 45° and 60°. The impacting type separator 600 may advantageously perform gas liquid separation in a water electrolysis plant or factory without requiring additional space and/or energy consumption.

Figure 7:
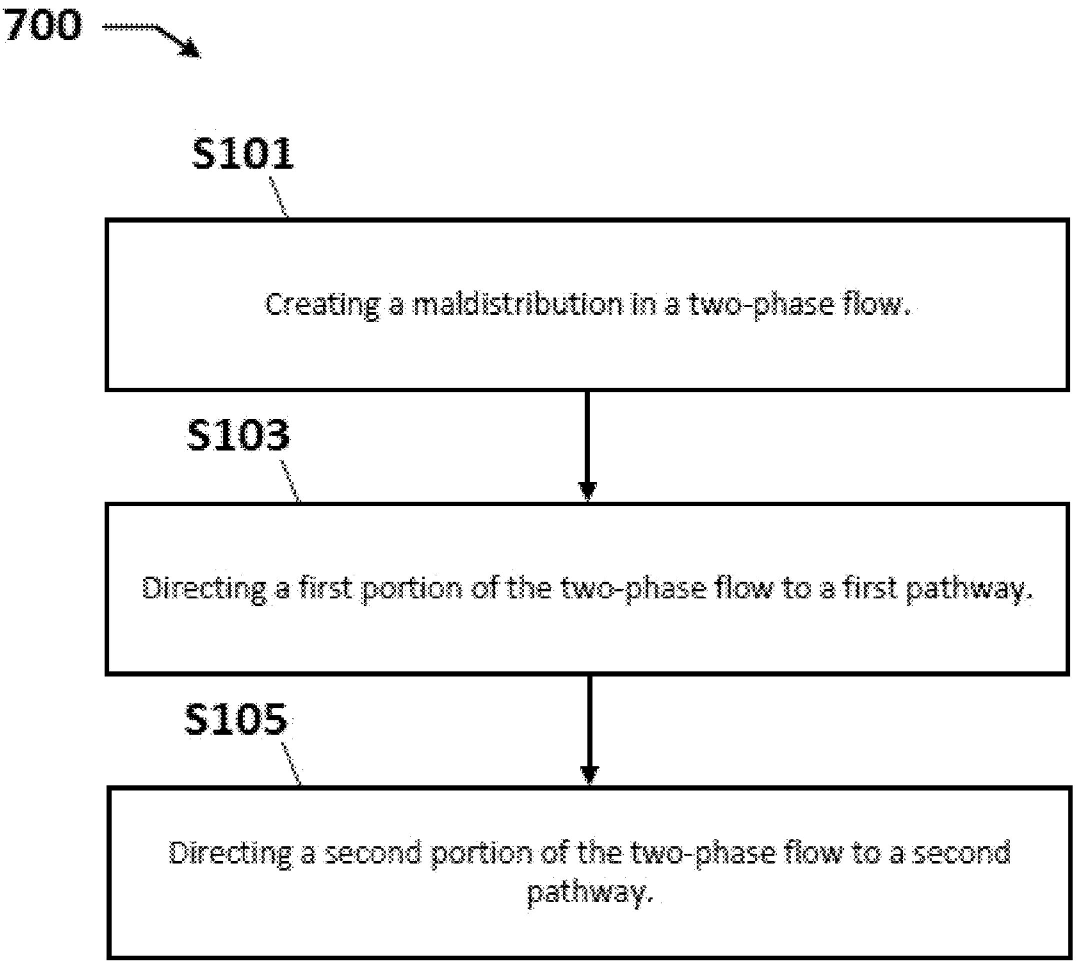
FIG. 7 depicts a flow chart for gas-liquid separation according to an exemplary embodiment of the present disclosure.

FIG. 7 illustrates a flow chart 700 for gas-liquid separation according to an exemplary embodiment of the present disclosure. Any of the separators 100, 101, 102, 400, 500, 550, and 600 may separate a two-phase flow of liquid and gas using the acts of flow chart 700. Additional, different, or fewer acts may be provided.

At act S101, a maldistribution of liquid matter and gaseous matter is created in a two-phase gas-liquid flow. In some embodiments, the maldistribution may be a spiral flow through a conduit. For example, a spiral flow may be created in a circular conduit when the two-phase flow entering the circular conduit impinges on a wall of the conduit. In another example, a maldistribution may be created by directing a two-phase flow to or through an inertial separator. For example, a maldistribution may be created as a two-phase flow moves through a run type inertial separator (e.g., separators 400, 500, 550) or an impacting type inertial separator (e.g., separator 600).

The maldistribution may cause a first portion of the two-phase flow to have a higher percentage of liquid than the entire two-phase flow. Additionally, the maldistribution may cause a second portion of the two-phase flow to have a higher percentage of gas than the entire two-phase flow. For example, when the separator 100 is used the first portion of the two-phase flow may be a portion of the flow located radially outward from a center of the conduit and the second portion of the two-phase flow may be a portion of the flow through a center of the conduit.

At act S103, a first portion of the flow is directed to a first pathway. The first portion of the flow may include a higher percentage of water than the two-phase flow and may be directed to a first pathway. For example, when the separator 100 is used, the first portion of the flow may be a radially outward portion of the flow and may be directed to a flow plate 150 of the separator 100 and out the second outlet 60. In other examples, when a run type inertial separator (e.g., separators 400, 500, 550) is used, the first portion of the flow may be directed to a run arm 430 of the separator. In some examples, the run arm 430 may include a hydrophilic media 510 to prevent gas from flowing into the run arm 430. In yet another example, when an impacting type inertial separator (e.g., separator 600) is used the first portion of the flow may be directed to a downward arm 630 of the separator 600.

At act S105, a second portion of the flow is directed to a second pathway. The second portion of the two-phase flow may include a higher percentage of gas than the entire two-phase flow and may be directed to a second pathway. For example, when the separator 100 is used, the second portion of the flow may be a center portion of the flow and may be directed to a converging channel 120 and a center channel 130 of the separator 100. In other examples, when a run type inertial separator (e.g., separators 400, 500, 550) is used, the second portion of the flow may be directed to a side arm 420 of the separator. In some examples, the side arm 420 may include a hydrophobic media 520 to deter liquid from flowing into the side arm 420. In yet another example, when an impacting type inertial separator (e.g., separator 600) is used the second portion of the flow may be directed to an upward arm 620 of the separator 600.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A gas-liquid separator apparatus comprising:

an inlet configured to receive a first portion of a two-phase flow, the first portion flowing through a center of a conduit;

a converging channel fluidly coupled to the inlet and configured to receive the first portion of the two-phase flow;

a first outlet fluidly coupled to the inlet and the converging channel and configured to receive the first portion of the two-phase flow;

a collector plate configured to receive a second portion of the two-phase flow, the second portion flowing at an outside of the conduit and not flowing through the inlet; and a second outlet fluidly coupled to the collector plate and configured to receive the second portion of the two-phase flow.

2. The gas-liquid separator apparatus of claim 1, further comprising:

a center channel fluidly connected to the inlet, the converging channel, and the first outlet, the center channel located between and connecting the converging channel and the first outlet.

3. The gas-liquid separator apparatus of claim 2, further comprising:

fins located on the converging channel or the center channel.

4. The gas-liquid separator apparatus of claim 3, wherein the conduit is an outlet manifold connected to a plurality of electrolytic cells or an electrolytic cell stack.

5. The gas-liquid separator apparatus of claim 3, wherein the conduit is a circular conduit.

6. The gas-liquid separator apparatus of claim 1, wherein the conduit is an outlet manifold connected to a plurality of electrolytic cells or an electrolytic cell stack.

7. The gas-liquid separator apparatus of claim 1, wherein the conduit is a circular conduit.

* * * * *